3,297,983
METHODS AND APPARATUS FOR ACOUSTIC WELL LOGGING
Gerald C. Summers, Dallas, Tex., assignor, by mesne assignments, to Mobil Oil Corporation, a corporation of New York
Continuation of application Ser. No. 575,541, Apr. 2, 1956. This application June 23, 1959, Ser. No. 822,389
34 Claims. (Cl. 340—18)

This application is a continuation of copending application Serial No. 575,541 filed April 2, 1956, now abandoned.

This invention relates to methods of and apparatus for the measurement of a velocity characteristic of the strata adjacent well bores and has for an object the provision of a method and apparatus, reliable in operation, by means of which velocity well logs of greater accuracy may be obtained.

Velocity logs are of increasingly great importance not only in the information they themselves yield as to the character of earth formations in the strata along a given borehole but also by reason of the fact they comprise an important tool which enables the seismologist to the interpret with greater certainty seismograms taken over an extended area including the location of the borehole. While velocity logs themselves are well known by those skilled in the art, much has been left to be desired in producing a velocity log unaffected by a changing diameter of borehole, unaffected by mud, liquid and other material in which the exploring unit is immersed and which is not dependent upon highly accurate detection of low-level acoustic energy marking the initiation of an acoustic pulse and the arrival of such low-level energy at a receiver.

While I have disclosed in my Patent 2,704,364 both single-receiver and two-receiver systems, the present invention represents substantial and material improvement thereover in that there has been eliminated unwanted effects of any cable cross-feed of the signals transmitted to the earth's surface from the receivers of a two-receiver system. The present invention also represents an improvement over the system for eliminating unwanted cable crossfeed of the type shown in my copending application Serial No. 287,853, now U.S. Patent 3,191,145.

In single-receiver acoustic well logging systems the acoustic energy path from a transmitter to a receiver includes a liquid path from the transmitter to the earth strata and a liquid path from the earth strata to the receiver. The added travel time through these paths is taken into account to obtain an accurate measurement of the velocity characteristic of earth strata adjacent the borehole. This, of course, requires some means for determining the lengths of the liquid paths and the density of such paths. The two-receiver system automatically and without need for supplementary apparatus takes into account the total travel time of an acoustic pulse through liquid paths in the borehole in production of a velocity log dependent essentially upon the properties of the earth formations or strata adjacent the borehole. This is by reason of the fact that in a two-receiver system the total travel time of an acoustic pulse from the transmitter to a first receiver is effectively subtracted from the total travel time of the same acoustic pulse from the transmitter to a second receiver spaced farther from the transmitter than the first receiver. Both the total travel times above referred to include the travel time through the liquid path from the transmitter to the earth formation and each includes the travel time through the liquid path from the earth formation to the respective receivers. By subtracting the above-mentioned total times one from the other, the travel times through the liquid paths are cancelled and there remains the sought after travel time of the acoustic pulse through the earth formation from a point opposite the first receiver to a point opposite the second receiver.

In carrying out the present invention in one form thereof, a transmitter generates in succession a series of acoustic pulses which travel outwardly therefrom and along and through the formations and strata adjacent the borehole. The acoustic energy from each pulse, after traversing said strata, appears at a first of the receivers which immediately responds thereto. The signal from the first receiver is transmitted uphole over a transmission line. Upon arrival of the signal uphole, i.e., at the earth's surface, there is transmitted from the earth's surface a control signal to which a circuit-changing means responds to disconnect the first receiver from the transmission line and to connect the second receiver to the transmission line. When the acoustic energy reaches the second receiver, it responds to produce an electrical signal which is transmitted to the earth's surface. At the earth's surface there is accurately measured the time interval between the arrival of the first signal from the first receiver and the arrival of the signal from the second receiver which is a measure of the velocity characteristic of the strata adjacent the borehole corresponding with the separation distance between the two receivers. As will later be more fully explained, a number of advantages accrue in accordance with the present invention, the result of which is a velocity log of extended usefulness and by means of which added information is afforded the seismologist in his understanding of the sub-surface strata and in his interpretation of seismograms.

For a more complete description of the invention, together with further objects and advantages thereof including additional circuits and arrangements forming a part of this invention, reference is to be had to the following detailed description taken in conjunction with the accompanying drawings, in which.

Figures 1, 2:
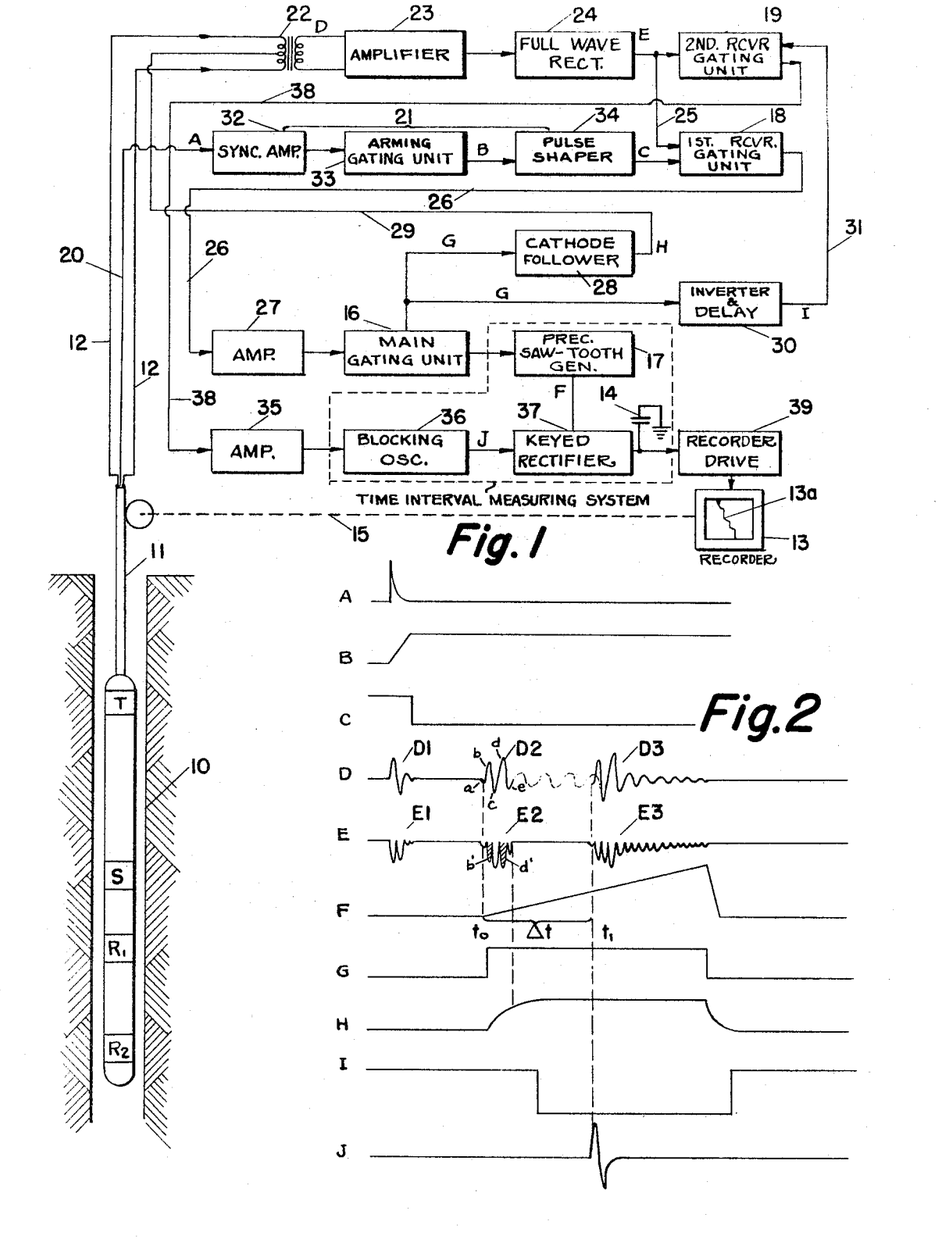
FIG. 1 diagrammatically represents an acoustic well logging system embodying the present invention.
FIG. 2 includes a plurality of graphs explanatory of the present invention.

Referring now to FIG. 1, there is disclosed a well logging system in which a transmitter T and receivers R1 and R2 are positioned within a borehole 10. The transmitter T and the receivers R1, R2 are normally maintained in a fixed spaced relation one from another, and supported as a unit by way of any suitable means, for example, a transmission line or cable 11 electrically connecting the transmitter and receivers to surface or uphole measuring and recording equipment.

The transmitter T may be of any suitable type, of which there are several well-known to those skilled in the art, for producing a series of spaced pulses of acoustic energy. The pulses of acoustic energy travel through the strata adjacent the transmitter to be received in sequence by the receivers R1 and R2 in the determination of the velocity characteristic of earth strata adjacent the borehole.

The velocity characteristic can be determined by measuring the time that it takes for acoustic energy to travel a known distance between one point in the earth's strata and a second point. Hence, in the two-receiver systems the velocity characteristic may be represented by the time interval which elapses between the reception of the acoustic pulse at a first receiver and the reception of the same acoustic pulse at a second receiver. More particularly, a first receiver R1 produces an electrical signal in response to the arrival of an acoustic pulse generated by the transmitter T. The electrical signal is normally transmitted uphole over a cable 11 including conductors associated with the receiver to initiate the operation of the timing means. A second electrical signal generated by the receiver R2 upon arrival of the same acoustic pulse from the transmitter T is transmitted uphole over other conductors in the cable 11. The timing means is responsive to the generation of the second electrical signal to measure the interval of time elapsed between the generation of the first and second electrical signals by the receivers R1 and R2.

Where the timing device produces an electrical signal whose magnitude is representative of the elapsed time interval, such signal may be applied to a suitable recorder 13 for production on a chart thereof of a mark, the position of which mark on the chart is representative of the magnitude of the time interval. A plurality of such marks taken at varying distances in the borehole will result in a graph, for example, the line 13a which will be a log representative of the velocity characteristic of earth strata adjacent the borehole.

In one form of timing means suitable for the practice of the present invention and as more fully described in my Patent 2,704,364, there is generated in response to the arrival of an acoustic pulse at the receiver R1 a monotonically varying function. By "monotonically" I mean a function of varying magnitude whose slope does not change sign during the period of utilization thereof. Coincidentally with the detection of the acoustic pulse by the receiver R2 a capacitive element 14 is charged to a voltage equal to the instantaneous magnitude of the monotonically varying signal or voltage. The voltage of the capacitor is inversely proportional to the velocity characteristic of the earth strata formations between the receivers R1 and R2.

The chart of the recorder 13 is driven as by way of mechanical connection 15 so as to provide a correlation between the measured velocity of an earth formation and the depth of that particular earth formation.

It is difficult to realize the production of accurate velocity logs through utilization of two-receiver systems by reason of cross-feed introduced within the transmission cables. The cross-feed introduces ambiguities in the production of a velocity log by reason of the cables conventionally used by service companies not being provided with sufficient insulating and shielding characteristics to prevent a signal from one receiver from being introduced into conductors associated with the other receiver. In accordance with one aspect of the present invention the problem of cross-feed is obviated by alternately connecting the receivers to a transmission line extending to the earth's surface after each acoustic pulse in a manner such that each receiver detects the same acoustic pulse. This aspect of the invention first will be described employing only a fraction of the circuits represented in FIG. 1.

Initially the receiver R1 by means of a downhole switch S is connected to the cable 11 and conductors 12 with the receiver R2 disconnected therefrom. Upon arrival at the first receiver R1 of an acoustic pulse generated by the transmitter T the receiver generates an electrical pulse D2 (FIG. 2) which is transmitted uphole by way of the conductors 12. A main gating unit 16 responds to the production of the electrical pulse at time $t_0$, corresponding to the onset of the electrical signal D2, to effect the energization of a saw-toothed generator 17 for production of a monotonically varying function or signal F (FIG. 2). Simultaneously, the main gating unit 16 produces a control pulse G which is delayed before application to the downhole equipment for reasons hereinafter to be explained. The downhole switch S responds to the delayed pulse as represented by pulse H to disconnect the receiver R1 from and to connect the receiver R2 to the conductors 12 of the cable 11.

Upon the arrival of the same acoustic pulse from the transmitter T the receiver R2 detects the pulse and generates an electrical signal D3 which is transmitted uphole to effect the opertion of means which measures the instantaneous value of the monotonic signal F at time $t_1$. This means charges the capacitor 14 to the instantaneous magnitude of the monotonic function. Its voltage is measured and record made thereof by the recorder 13. The charge upon the capacitor 14 is representative of the elapsed time $\Delta_t$ required for an acoustic pulse to traverse the earth strata along a path extending from a point opposite the receiver R1 to a point opposite the receiver R2.

It will be observed from the above discussion that by providing a single pair of conductors 12 comprising a transmission line from the receivers R1 and R2 to the surface equipment and by selectively connecting the receivers R1 and R2 to the conductors 12 there no longer need be any concern about cross-feed between the receiver signals. Accordingly, distinct signals, free of cross-feed, are made available at the earth's surface for the production of the velocity log.

Now that the broader aspects of the invention have been described emphasizing the manner in which separate signals are successively and separately transmitted from the individual receivers R1 and R2, there will now be presented further features of the system of FIG. 1.

In the description to follow it will be understood that the receiver R1 is initially connected by way of the circuit changing means or switch S to the conductors 12 and that the receiver R2 is disconnected. The channel for the receiver R1 to the main gating unit 16 is, in the preferred form of the invention, blocked by a channel-controlling means or first receiver gating unit 18. The gating unit 18 is opened to transmit a signal to the main gating unit 16 only at such times succeeding the production of an acoustic pulse by the transmitter T. In this manner there is prevented the application of spurious noise and other signals, generated downhole and detected by the first receiver R1 or otherwise picked up by the conductors 12, which might otherwise be transmitted to the main gating unit 16 to thereby initiate production of the monotonic function. Where conditions are ideal, i.e., absence of noise signals downhole, it will be understood that the system of the present invention is fully operable without the first receiver gating unit 18 and under such conditions the channel from the earth's surface end of the conductors 12 to the main gating unit may be at all times open. Inasmuch as noise signals may be generated by possible banging of the downhole equipment, including the transmitter T and the receivers R1 and R2, against the walls of the borehole 10, it is preferred that the first receiver gating unit be included in the system.

The channel from the earth's surface end of the conductors 12 to the measuring equipment is blocked by a second receiver gating unit 19. The gating unit 19 prevents signals from the first receiver from being applied to the measuring equipment to initiate the measurement of the instantaneous magnitude of the monotonic function and thus avoids introduction of erroneous measurements in the preparation of the velocity log. The manner in which the first receiver gating unit 18 and the second receiver gating unit are opened to pass signals respectively from the first and second receivers will now be described.

Upon the production of an acoustic pulse from the transmitter T there is simultaneously generated in manner well known in the art a synchronizing pulse A (FIG. 2) which is transmitted uphole over conductor 20 to a pulse generating and shaping circuit 21 which produces a pulse C. The first receiver gating unit 18 responds to the pulse to open the circuit or channel to the main gating unit 16. Thereafter the electrical signal D2, produced by the first receiver R1, is transmitted uphole and applied to full-wave rectifier 24 by way of transformer 22 and amplifier 23. The wave D2 is rectified to a form E2 (FIG. 2) for reasons hereinafter discussed, and the rectified signal E2 is applied to the main gating unit 16 by way of channel 25, the now open receiver gating unit 18, channel 26 and amplifier 27. With the opening of the main gating unit 16 the saw-tooth generator or monotonic signal generator responds to begin the production of the monotonically varying function, a voltage F. Also with the opening of the main gating unit 16 there is produced by the gating unit a pulse G which is applied from the main gating unit by way of a delay circuit 30 which transforms it to the pulse I and thence by way of channel 31 to the second receiver gating unit 19 which has heretofore been closed. The second receiver gating unit 19 now responds to the pulse I to provide an open channel for electrical signals subsequently to be produced by the receiver R2.

The first receiver R1 is disconnected from the cable 11 and the second receiver R2 is connected to the cable in the following manner. Upon opening the main gating unit 16 produces the control pulse G, which after delay and assuming the form of pulse H, is applied by way of channel 29, and a phantom circuit including the primary of transformer 22 and conductors 12 to the downhole switch S. The switch now responds to disconnect the receiver R1 from the conductors 12 and to connect the receiver R2 to the conductors. The signals from the receiver R1 which may be continuing as a result of reverberation of the acoustic pulse in the earth strata adjacent thereto is thereby removed from the cable 11 and any possible interference thereof with a subsequently produced signal by the receiver R2 is thereby nullified. The electrical signal D3 produced by receiver R2 is applied to full-wave rectifier 24 by way of conductors 12, transformer 22 and amplifier 23. The rectified wave E3 passes through the open second receiver gating unit 19 and is effective to initiate the measurement of the instantaneous value of the monotonic voltage F coincident in time with the detection by the second receiver R2 of the acoustic pulse.

In accordance with another aspect of the present invention the opening of the first receiver gating unit 18 is delayed for a predetermined period of time after the initiation of the synchronizing pulse A in order to avoid the possibility that the synchronizing pulse will initiate operation of the monotonic generator 17. Inasmuch as the synchronizing pulse A is generated at a point downhole and is transmitted over cable 11 and, more particularly, conductor 20 to the uphole equipment there is a possibility that through cross-feed a signal D1 (FIG. 2) corresponding with the synchronizing pulse may be introduced into the conductors 12 and then applied to the input of the first receiver gating unit or first channel-controlling means 18 as by way of the transformer 22, amplifier 23 and the full-wave rectifier 24. Thus, if the first receiver gating unit is opened at a time corresponding with the initiation of the synchronizing pulse it is possible that there may be transmitted through the gating unit a signal E1 (FIG. 2) effective to initiate false operation of the saw-tooth generator 17 thus introducing ambiguity in the production of the velocity log. Accordingly, the synchronizing pulse A is applied by way of amplifier 32 to an arming gating unit 33. The arming gating unit is effective to produce a control pulse B including an effective time delay of extent adequate for the magnitude of the synchronizing pulse to become substantially zero before the gating unit 18 is opened. The control pulse B is shaped to a square waveform by pulse shaper 34 and the shaped pulse C is applied to the first receiver gating unit 18 which responds to the onset or leading edge thereof to open the channel from the first receiver.

The time delay introduced by the arming gating unit 33 is primarily determined by the length of time it takes for the synchronizing pulse to die out. Of course, the time delay can be longer. However, it should not be any longer than the time it takes for an acoustic pulse to travel from the transmitter T through earth strata of highest known velocity to the first receiver R1. For example, the highest velocity encountered is of the order of 25,000 feet per second. Accordingly, with the first receiver spaced six feet from the transmitter T an acoustic pulse traveling through the high velocity strata would reach the first receiver in approximately 240 microseconds. Accordingly, the delay introduced by the arming gating unit in the above example should be less than 240 microseconds. A time delay of about 200 microseconds has been found adequate.

The disconnection of the first receiver and the connection of the second receiver to the uphole equipment is delayed for a period of time subsequent to the operation of the main gating unit or control pulse generating means 16 and for the following reason. It is desirable to view the character of the signals obtained from the receivers. For this purpose an oscilloscope is normally employed. In the absence of a delay the first receiver would be turned off so quickly that an observer would only get a very sketchy picture of the first receiver output. Accordingly, in order that the observer be able to see at least two or three full cycles of the first receiver output, the control signal transmitted to the downhole equipment is delayed. Secondly, because the conductors in the cable extending downhole are not shielded the cross-feed is predominately capacitive and therefore the cross-feed in the downhole cable increases with frequency. In order to prevent the appearance as by cross-feed of false signals on the receiver channel, the control signal or pulse is delayed in transmission downhole over the phantom circuit including the receiver-channel leads or conductors. The delay in the control pulse, which may be introduced, for example, by passing the pulse through a low pass filter, effectively reduces the high frequency components of the control signal.

The amount of delay introduced in the switching control pulse H is determined in part by the highest velocity strata to be encountered adjacent the borehole and by the physical spacing between the receivers R1 and R2. For example, where the receivers are spaced six feet apart and the earth strata has a velocity of 25,000 feet per second the delay introduced into the switching control signal should not exceed 240 microseconds.

The second receiver gating unit or second channel-controlling means 19 is opened to pass signals from the second receiver at a time coincident with or soon after the connection of the second receiver. Hence since the connection of the second receiver is delayed a similar delay is introduced to the control pulse supplied to the second receiver gating unit by the delay network 30. The second receiver gating unit then opens in time coincident with the onset of the control pulse I. If the second receiver gating unit is to be opened subsequent to the first receiver it should not be opened any later than the time for an acoustic pulse to travel the distance between the receivers through the highest velocity strata. In the example of receiver spacing and acoustic velocity set forth above, if the second receiver is connected within a time interval less than 240 microseconds the second receiver gating unit can be opened a period of time later, for example, at the end of the 240-microsecond period. The function of the second receiver gating unit is to prevent signals, for example, from the first receiver or from other sources from being applied to the measuring system and thus producing a false reading of the monotonic function F. Thus, the second receiver gating unit can be arranged to open coincidentally with or after the connection of the second receiver but before the time at which an acoustic pulse may be expected to arrive at and be detected by the second receiver.

The time interval measuring system of my Patent 2,704,-

364 includes in a preferred arrangement the monotonic function generator 17, blocking oscillator 36, switch 37 and the capacitor 14. While its operation will be more specifically described hereinafter, it will now be referred to briefly in order to show how the signal from the second receiver is effective to cause the sampling and/or measurement of the instantaneous value of the monotonic function F.

The rectified electrical signal E3 from the second receiver is applied to the blocking oscillator 36 by way of gating unit 19, channel 38 and amplifier 35. The blocking oscillator 36 responds to produce a pulse J (FIG. 2) which activates the switch 37 operating to connect electrically the capacitor 14 in circuit with the output of the generator 17 and thus charge the capacitor to the instantaneous voltage of the monotonic function F. The voltage of the capacitor 14, representative of the velocity characteristic of the earth characteristic between the receivers R1 and R2 is applied by way of recorder drive 39 to the recorder 13 where a permanent record is made of the characteristic at a particular depth in the borehole.

Figure 4:
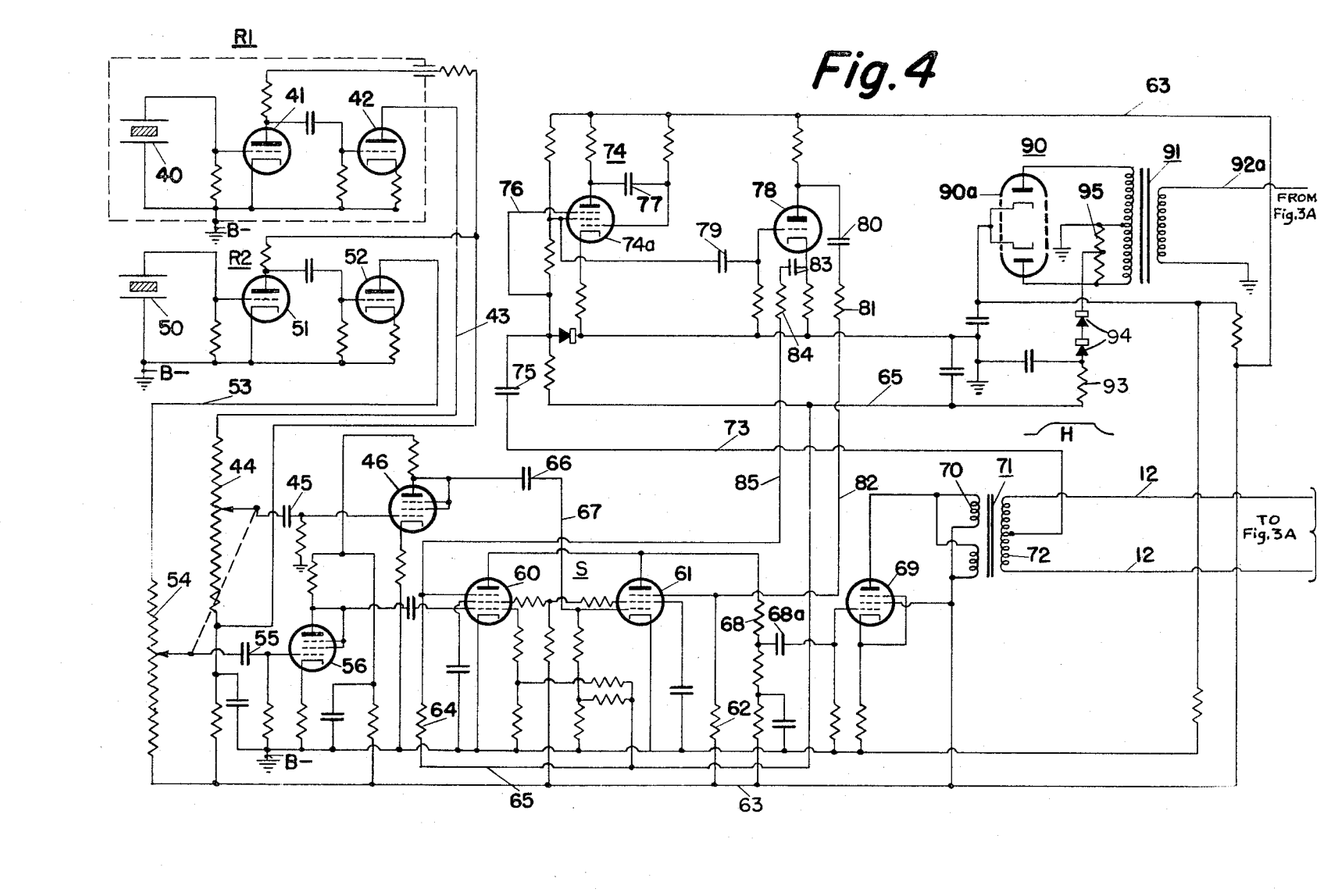
FIG. 4 schematically illustrates the downhole receivers and switching equipment of FIG. 1.

Now that the generatl operation has been described, reference will be made to specific circuits suited for carrying out the production of an accurate log of the velocity characteristic of earth strata adjacent the borehole and embodying further aspects of the present invention. The circuits while omitting conventional elements such as heater filaments are sufficient to show one skilled in the art how to practice the invention. It will be further understood that where, for example, pentodes are described triodes may be preferred and that other equivalent timing devices, detectors and pulse generators may be utilized for those specifically disclosed. Referring now to FIG. 4, there is schematically illustrated downhole equipment including the receivers R1, R2 and the switch S. The receiver R1 includes a crystal detector which may be of the piezo-electric type producing oscillatory electrical signals upon mechanical movement thereof, as for example by acoustic vibrations or elastic pulses received from a transmitter T by way of the earth strata adjacent the borehole. The output from the piezo-electric crystal 40 is initially amplified by voltage pre-amplifying stages 41 and 42 and then applied by way of conductor 43, gain control potentiometer 44 and capacitor 45 to the input of amplifier 46. The tube employed in the amplifier is shown as a pentode connected for triode operation.

The receiver R2 is similarly arranged. It is comprised of a piezo-electric crystal type detector 50 whose electrical output of oscillatory character representative of an acoustic pulse or elastic pulse from the transmitter T by way of earth strata adjacent the borehole is amplified by preamplifying stages 51 and 52. The output from the pre-amplified stage 52 is connected by way of conductor 53, gain control potentiometer 54 and a capacitor 55 to the input of amplifier 56.

The receivers R1 and R2 are alternately connected for transmission of their output signals uphole to the measuring apparatus at the earth's surface by way of the circuit-changing means or switch S which is of the electronic type including switching stages 60 and 61. During initial conditions the switching stage 61 is rendered conductive by reason of its suppressor grid's being connected by way of resistor 62 to the B+ bus 63. The switching stage 60 is rendered non-conductive by reason of its suppressor grid's being connected by way of resistor 64 to bus 65 connected to a source of negative bias. Accordingly, only the output signals from the receiver R1 and amplified by the amplifier 46 can be transmitted uphole.

The output signal from the amplifier 46 is applied by way of coupling capacitor 66 and conductor 67 to the control grid of the switching stage 61. The plate circuit of stage 61 is connected by way of resistor 68 and coupling capacitor 68a to the control grid of a pentode amplifier stage 69 whose output circuit includes the primary 70 of transformer 71. The secondary winding 72 is connected to conductors 12 of cable 11.

Upon operation of the main gating unit 16 (FIG. 1) the control pulse H is transmitted downhole over the cable 11 by way of a phantom circuit including the conductors 12 and the center tapped secondary winding 72. The control pulse H is then effective by way of conductor 73 to initiate the operation of a control means, including a control pulse generator 74, to cut off the switching stage 61 and to render conductive the switching stage 60 thus effectively disconnecting the first receiver R1 and connecting the second receiver R2 and in the following manner.

The pulse generator 74 is of the phantastron type. While its circuit operation is well understood by those well skilled in the art, a detailed description may be found in Waveforms, Chance et al. at section 5.15, et seq. Briefly, however, during normal operation the phantastron tube 74a, which is of the pentode type, has its suppressor grid biased to cut off plate current. When a positive pulse such as, for example, the pulse H, is applied to the suppressor grid as by way of conductor 73, capacitor 75 and conductor 76 the voltage of the suppressor grid is raised to a positive value and current flows in the plate circuit and the plate voltage drops. The grid, being coupled to the plate circuit by way of capacitor 77, has its voltage reduced with the drop in plate voltage. The end result of the reduction in grid bias is that the screen current of the tube is so greatly reduced that a large positive pulse appears at the screen. The positive pulse at the screen will continue for a time coincident with the duration of the waveform or pulse H.

The positive pulse from the phantastron 74 is applied to the input of a phase inverter 78 by way of coupling capacitor 79. The phase inverter is provided with two output circuits, one of which being a plate output circuit coupled to the suppressor grid of the first switching stage 61 by way of capacitor 80, resistor 81 and conductor 82. The second output circuit is a cathode output which is connected to the suppressor grid of the second switching stage 60 by way of capacitor 83, resistor 84 and conductor 85. The conduction of the phase inverter 78 upon application of the control pulse from the phantastron 74 causes its plate voltage to drop and its cathode voltage to increase. Accordingly, a negative-going signal is applied to the suppressor grid of the stage 61 to drive it to cut-off and a positive-going pulse is applied to the suppressor grid of the stage 60 to render that stage conductive. Thereafter, for the duration of pulse H, signals from the second receiver are provided with an open channel uphole over the transmission conductors 12 to the measuring and recording equipment while signals from receiver R1 are cut off.

At the end of the pulse H the negative bias from bus 65 is once more effective to cause the suppressor grid of tube 74a to reduce current flowing in the plate circuit of the tube. The plate voltage rises and this rise is transferred by way of capacitor 77 to the control grid of tube 74a. The cathode current increases as a result of the control grid's going more positive and this current flows in the screen grid circuit and the screen grid voltage is thereby lowered. As a result of the lowered screen grid voltage at tube 74a the switch S is made effective to reconnect the receiver R1 and to disconnect the receiver R2 and in the following manner.

The reduction in voltage at the screen grid of tube 74a and applied to the control grid of the phase inverter 78 causes the plate voltage of the inverter to increase and the cathode voltage to decrease. Accordingly, the suppressor grid of switching stage 61 is made more positive and the stage once more conducts. The suppressor grid of the switching stage 60, being connected to the cathode circuit of the inverter stage 78, is made less positive. The negative bias applied from the bus 65 is once more effective to drive the stage 60 to cut-off.

The first receiver R1 will remain connected to the conductors 12 by way of stage 61 until such time as a signal from the receiver R1, in response to an acoustic pulse, is effective by way of the uphole equipment to produce another control pulse H. At such time the connections of the receivers R1 and R2 will be reversed, i.e., receiver R2 will be reconnected.

The period or duration of time during which the second receiver is connected or "turned on" is primarily determined by the time it would take for an acoustic pulse traveling through earth strata of the lowest velocity to be encountered in boreholes to move from a point opposite the first receiver to the second receiver. Hence, where the receivers are spaced a distance of six feet along the borehole and the slowest acoustic velocity, the velocity of the borehole fluids, is in the nature of 5,000 feet per second, the second receiver should be connected for 1.2 milliseconds. Of course, the second receiver can be connected or turned on for a longer period of time, for example, two or three milliseconds and longer depending upon other factors, for example, the repetition rate of the acoustic pulses generated by the transmitter. The reversal of receiver connection, i.e., the reconnection of the first receiver R1, will be made before the next acoustic pulse is generated by the transmitter.

A suitable source of power for the equipment downhole is provided by a rectifier 90 which derives A.C. power by way of transformer 91 electrically connected to a suitable uphole source of supply 92 (FIG. 3A) by way of conductor 92a. The rectifier arrangement or power supply provides both the necessary plate voltage and the grid bias for the various stages comprising the downhole equipment. The B+ is supplied by way of the bus 63 connected in the cathode circuit of the rectifier tube 90a. The negative bias potentials are obtained by way of the buses 65 connected through resistor 93 and rectifiers 94 to a voltage divider 95 connected across one-half of a secondary winding of the transformer 91.

The transmitter T (FIG. 1) may be of any suitable type, for example, a crystal transducer of the type illustrated in my Patent 2,704,364, or a hammer type, but is preferably of the magnetostrictive transducer type, known to those skilled in the art to be capable of generating pulses of high acoustic energy. The repetition rate of pulses produced by the transmitter T may be varied over a fairly wide range. One of the factors to be considered in adjusting the repetition rate of acoustic pulses is the time interval required for each of the acoustic pulses to be attenuated to the point where the receivers will no longer respond to the low order of acoustic energy. A repetition rate of 15 pulses per second has been found satisfactory. With such a repetition rate there is provided an interval of 67 milliseconds between each acoustic pulse which is more than adequate for natural attenuation of the acoustic energy. Under most conditions the repetition rate can be increased to as high as 50 pulses per second and even higher.

Figure 3A:
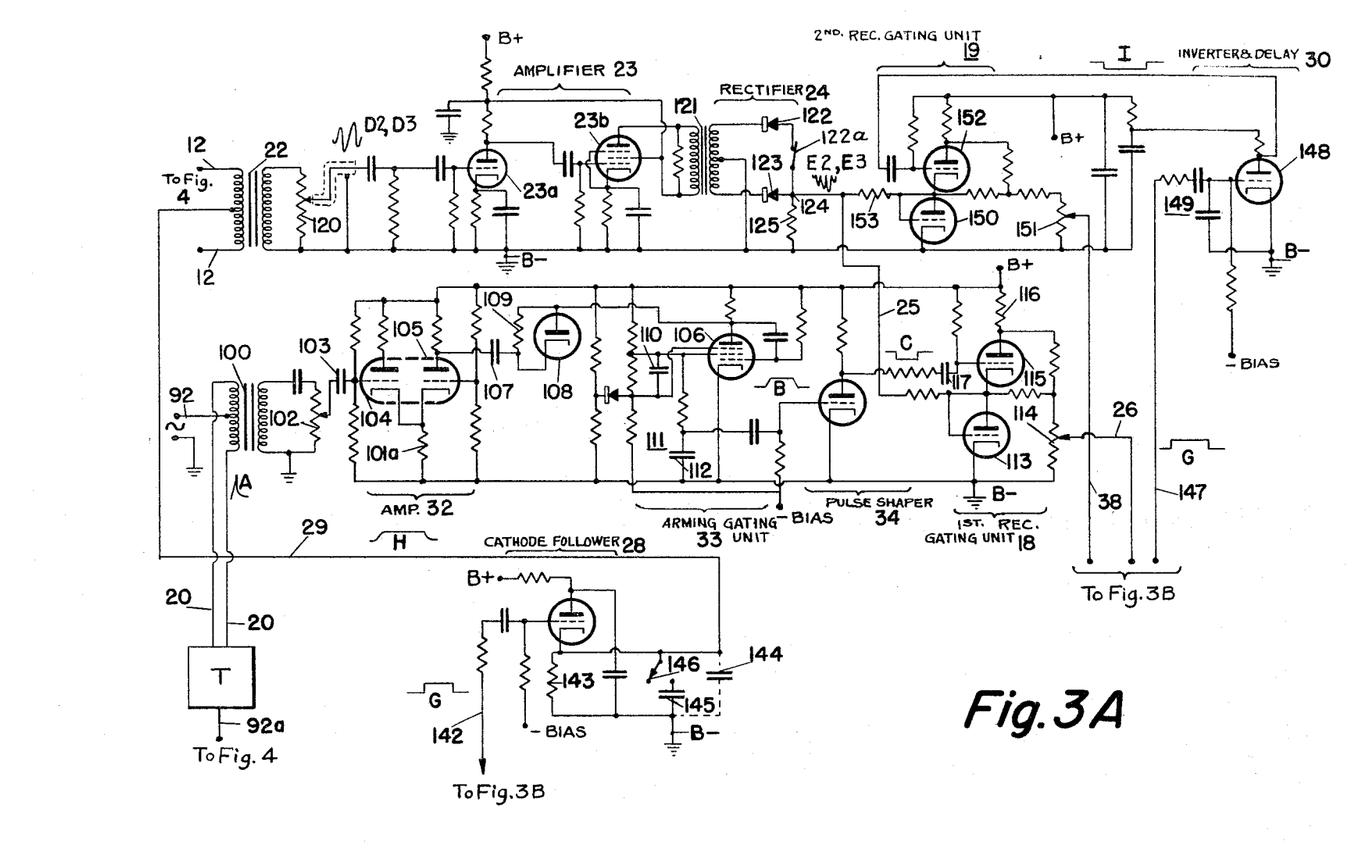
FIGS. 3A, 3B together schematically illustrate the uphole equipment of FIG. 1.
Figure 3B:
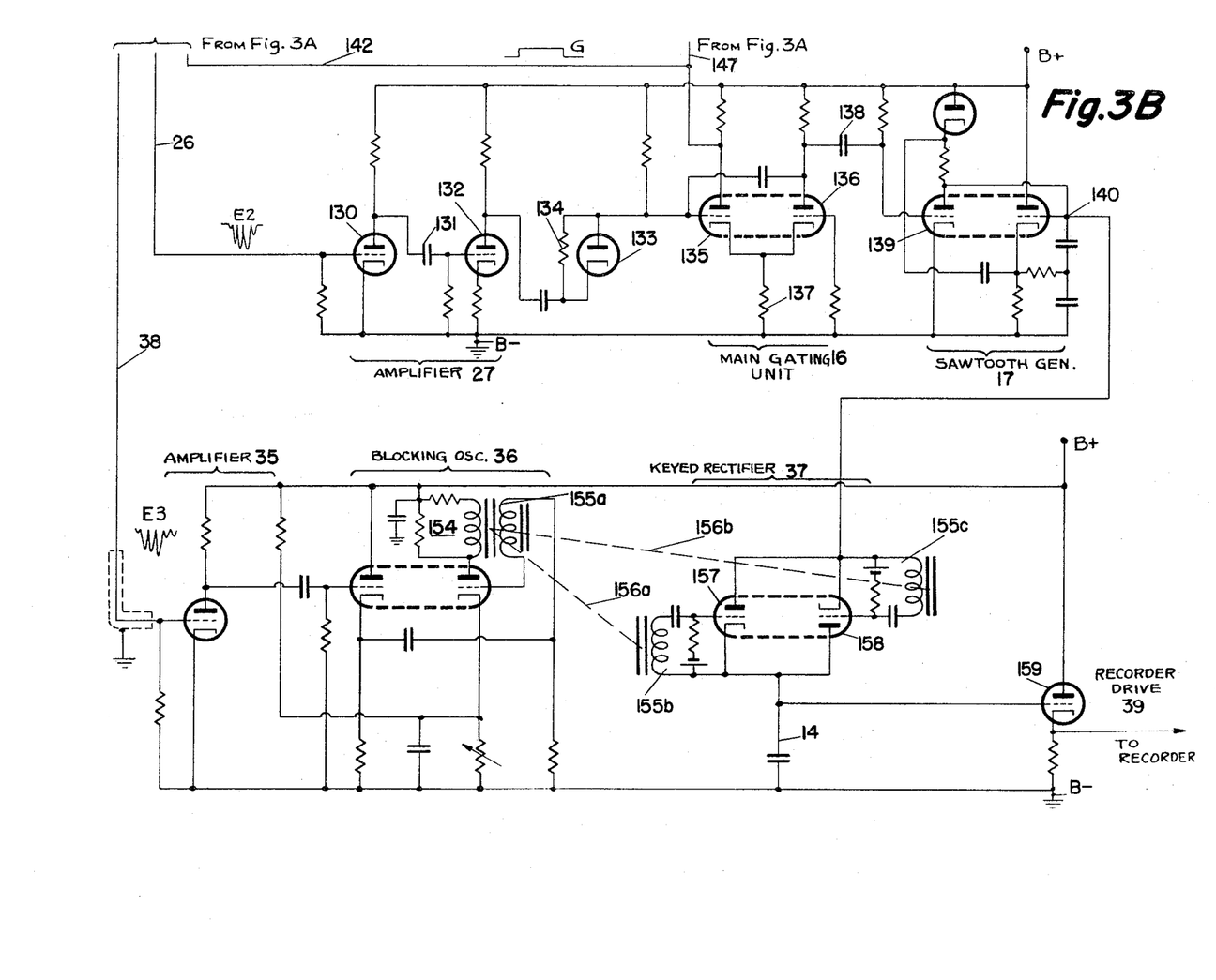

Now that it is understood the manner in which the receivers R1 and R2 are connected and disconnected from the cable 11 in order to obviate the problem of crossfeed, reference may be had to FIGS. 3A and 3B for description of the circuits comprising the uphole equipment and including the measuring and recording apparatus. It will be recalled that in a preferred form described in connection with FIG. 1, the synchronizing pulse A is generated in time coincident with the generation of the acoustic pulse from the transmitter T and that this synchronizing pulse is employed to open the first receiver gating unit 18 after a time period sufficiently long to assure that cross-feed of the synchronizing pulse will not interfere with the proper operation of the measuring system.

The synchronizing pulse A is transmitted uphole over conductors 20 to the primary of an input transformer 100. The polarity of the synchronizing signal is selectable by means of the transformer connections and a negative synchronizing pulse is applied to the input of a synchronizing amplifier 32 by way of gain control potentiometer 102 and coupling capacitor 103. The synchronizing amplifier comprises two stages 104 and 105 with their cathodes coupled to ground by common cathode resistor 101a. A negative input signal applied to stage 104 will result in a negative-going output signal at the plate of the stage 105. The plate circuit of the stage 105 is connected to the plate of a pentode 106, comprising with associated circuitry the arming gating unit 33, by way of coupling capacitor 107 and diode 108 shunted by a high impedance resistor 109.

The opening of the gating unit 18 and the length of time it remains open is governed by the arming gating unit 33 which may be a pulse generator, for example, of the multivibrator type, but is here shown to be of the screen coupled phantastron type including pentode 106. The duration of a gating pulse produced by the arming gating unit 33 in response to the synchronizing pulse A predetermines the time interval over which the gating unit 18 is open. The time at which the gating unit 18 is opened following the initiation of the synchronizing pulse A is determined by a delay network 111.

In the screen coupled phantastrons an output pulse is produced in the screen circuit in response to a single trigger or pulse input of short duration. The duration of the output pulse in the screen circuit is adjustable by circuit parameters of the phantastron circuit, for example, the capacitor 110. Hence the phantastron is, in effect, a timing circuit which is preferred because of its almost linear characteristic which makes it precisely adjustable to produce pulses of a desired duration. The operation of a screen coupled phantastron is well-known to those skilled in the art. A more complete description appears in the aforementioned text, Waveforms, starting at page 197.

Once the operation of the phantastron or arming gating unit 33 is initiated by application to its plate of the negative pulse by way of diode 108 the plate voltage continues to decrease. Accordingly, the plate of the diode 108 is made more negative with respect to its cathode and thus the diode acts as a circuit blocking means or circuit disconnect preventing the application of further negative pulses to the phantastron until the phantastron's cycle of operation has been completed.

The pulse from the screen circuit of the arming gating unit or phantastron 33 is delayed for approximately 200 microseconds by a network 111 shown to be of the integrator type and including the integrator capacitor 112. The integrated wave B is then applied to the grid circuit of a pulse shaper 34 which provides in response thereto a substantially rectangular waveform or pulse C which is effective to open the first receiver gating unit 18 after signal D1 has become sufficiently attenuated and for a period of time related to the duration of the pulse C.

The period of time over which the first receiver gating unit 18 is to be opened and hence the time interval duration of the pulse C is determined primarily by the length of time it will take for a pulse of acoustic energy to travel through the lowest velocity strata to be encountered adjacent the borehole from the transmitter T to the first receiver. Where the first receiver is spaced a distance of six feet from the transmitter and the lowest acoustic velocity to be encountered is 5,000 feet per second, the first receiver gating unit should be opened for a period of at least 1.2 milliseconds. Of course, the gate can be opened for a longer period of time, for example, three milliseconds and higher. The fact that the first receiver gating unit may be open during the time that the second receiver produces an electrical signal will not be detrimental to the proper operation of the system. Such a signal from the second receiver applied by way of the first receiver gating unit 18 may initially be considered as affecting the operation of the main gating unit 16. However, as will be discussed hereinafter, the main gating unit 16 is provided with a circuit blocking means which effectively disconnects the main gating unit from the first receiver gating unit once the main gating unit has been energized in response to the onset of an electrical signal from the first receiver.

The receiver gating unit 18 in the illustrated embodiment is of the electronic type and includes a diode-connected triode 113 connected in shunt with a potentiometer 114. The diode-connected triode 113 has its plate connected to the cathode of triode 115 which is normally conducting. The conduction of the triode 115 provides a low impedance path for the application of plate voltage from the source B+ through resistor 116 to the plate of the diode-connected triode 113. Thus, during initial operations the diode-connected triode 113 is conducting and provides a low impedance path in shunt with the potentiometer 114 effectively preventing the development of a voltage across the potentiometer in response to a signal applied from the first receiver as by way of channel 25. The gating unit 18 opens when the negative wave or pulse C is applied to the grid of the triode 115 as by way of coupling capacitor 117 to drive the triode to cut-off and thus reduce the potential applied to the plate circuit of the diode-connected triode 113. The conduction of the triode 113 is cut off, thus permitting the development across the potentiometer 114 of signals from the receiver R1 as by way of channel 25.

The channel 26 is now open for the passage of signals from the first receiver as by way of the gating unit 18 and the channel 26 to the main gating unit 16. Now, with gating unit 16 open, upon the arrival of an acoustic pulse at the receiver R1, the electrical signal generated by that receiver is applied to the primary of transformer 22 and thence by way of gain control potentiometer 120 to the input of a two-stage amplifier 23 including the triode stage 23a and pentode stage 23b. The plate circuit of the pentode stage 23b is connected to the primary winding of a transformer 121 whose secondary winding is connected to the fullwave rectifier 24. The rectifier 24 includes two diodes 122 and 123 having a common connection at voltage point 124 and having their other terminals respectively connected to opposite ends of the secondary winding. The secondary winding is center tapped and connected to ground. The common terminal of the diodes 122 and 123 is connected to ground by way of resistor 125. The rectified signal E2 is developed across the resistor 125 and applied by way of conductor or channel 25, gating unit 18 and conductor or channel 26 to the input of the amplifier 130, FIG. 3B.

As will later be explained in connection with FIG. 3B, the main gating unit 16 can be made to respond to either positive pulses or to negative pulses. As shown, it is made to respond only to negative pulses. With the foregoing in mind, there will now be explained the manner in which the full-wave rectifier 24 functions to minimize the amount of error which may be introduced by reason of the production by the two receivers R1 and R2, FIG. 1, of electrical signals or pulses which initially are of low amplitude. As already explained the signals from receivers R1 and R2 are oscillatory in character. The signals, for example signal D2, FIG. 2, include an initial excursion of low amplitude of one polarity, pulse $a$, followed by an excursion of opposite polarity, pulse $b$, of greatly increased magnitude. Pulse $a$ has been shown as negative-going and pulse $b$ has been shown as positive-going. Thus, it will be seen that with the main gating unit 16 responsive to or operable by a negative pulse, there arises the possibility that if the negative-going pulse is of amplitude insufficient to trigger the main gating unit 16, there will be a delay equal to a period or cycle of the electrical signal from the receiver R1 before the main gating unit 16 is triggered as by pulse $c$. The foregoing possibility is avoided by providing the full-wave rectifier 24 which converts the signal D2 to a signal E2 as illustrated in FIG. 2. Thus, if the first negative-going signal $a$ is insufficient to cause operation of the main gating unit 16 the positive-going signal $b$, converted by the rectifier to the negative-going signal $b'$, is of adequate amplitude to trigger the main gating unit 16. Thus, the error will be reduced to half of that which might otherwise arise.

A system such as that thus far described may be entirely satisfactory where the main gating unit 16 only responds to the somewhat higher level of energy as represented at $b'$, FIG. 2, in contrast with the low level signal illustrated at $a$. However, when increased accuracy is desired the switch 122a of FIG. 3A may be opened to disconnect the rectifier 122 from the circuit in which event the operation will be materially changed.

Assuming now that the switch 122a has been moved to its opened position it will be seen at once that the circuit will be polarity-selective. With the same assumption, i.e., the main gating unit 16 responds only to negative-going pulses, the disconnection of the rectifier 122 eliminates the output of the rectifier 24, as across the resistor 125, the negative-going signals $a$, $c$ and $e$ of the receiver output as illustrated at D2, FIG. 2. Thus, the only signals passed by the rectifier 24 through the channel 26, and amplifier 130 to the main gating unit 16 will be the negative-going pulses $b'$ and $d'$ of FIG. 2 corresponding with the positive-going pulses $b$ and $d$. Since the pulse $b$ is large in amplitude compared with the initial pulse $a$, the main gating unit 16 is always operated upon the appearance of the pulse $b$ and there is lacking the indeterminate operation previously described. In similar manner, the corresponding positive-going pulse of the second receiver R2 is applied by way of the rectifier 24, the second receiver gating unit 19, the channel 38, the amplifier 35, FIG. 3B, and thence to the blocking oscillator 36.

The significance of the foregoing operation, with the switch 122a open, will be better understood by contrasting the single-receiver system with the two-receiver system presently being described. In the single-receiver system the velocity characteristics of the strata formation adjacent the borehole are determined by the travel time of the acoustic pulse through the earth strata from the instant of generation at the transmitter T to the instant of arrival at the receiver. Inasmuch as it is the elapsed time which is of importance, it is essential in the single-receiver system that the monotonically varying function should be initiated coincidentally with the first break, i.e., the instant of generation of the acoustic pulse. It is of equal importance that the monotonically varying function be sampled, i.e., measured at the instant the acoustic pulse arrives at the receiver. The difficulty is that the initial energy of the pulse arriving at the receiver is of low amplitude and, accordingly, its detection gives rise to the difficulty heretofore pointed out, a difficulty which may result in errors as great as the period of the oscillatory signal characterizing the acoustic pulse from the transmitter.

By rejecting the series of pulses of that polarity including the first low-level pulse, for example, the negative-going pulses, as by opening the switch 122a, only the positive-going pulses will be passed by the rectifier 123 and appear as output signals $b'$ and $d'$ across resistor 125. The selective operation in terms of polarity to eliminate the initial impulse of low amplitude does not give rise to error in the two-receiver system for the reason that the travel time through the formation adjacent the borehole is made to depend upon the difference in the arrival time of the acoustic energy at the two receivers. As previously described, the foregoing difference represents a subtraction of the total travel time of the acoustic pulse from the transmitter to the first receiver from the total travel time of the acoustic pulse from the transmitter to the second receiver. By so subtracting them, the travel times through the liquid path from the transmitter to the earth formation and from the earth formation to the two receivers is eliminated, i.e., cancelled out, so that there remains only the travel time of the acoustic pulse through the earth formation from a point opposite the first receiver R1 to a point opposite the second receiver R2. It is to be further observed that the pulse delivered from the transmitter T and detected by the receiver R1 is the same pulse detected by the receiver R2, and thus it will be seen that the period of the initial excursion $a$, FIG. 2, will be of substantially the same period or length at the receivers R1 and R2. Thus, by eliminating the negative-going excursion $a$, there will be no error introduced in the system responsive only to the first positive-going excursion $b$ of adequate amplitude to insure operation of the main gating unit 16 and of the blocking oscillator 36 as the receivers R1 and R2 respond to successive pulses from the transmitter T.

Returning now to FIG. 3B, it will be seen that the plate circuit of the amplifier 130 is connected by way of coupling capacitor 131 to the input of a second amplifier 132 whose output signal, of the same polarity as the signal E2, is applied to the main gating unit 16 by way of diode 133 shunted by high impedance resistor 134.

The diode 133 is effective to pass only negative-going pulses from the amplifier 132 and operates in like manner to the diode 108 (FIG. 3A) to provide a disconnect between the main gating unit 16 and the amplifier 27 to prevent further negative signals from the amplifier from interfering with the operation of the main gating unit once the main gating unit has been triggered.

The main gating unit 16 or control pulse generating means is preferably a monostable multivibrator of the cathode-coupled type including triodes 135 and 136 whose cathodes are connected to ground by way of common cathode resistor 137. During an initial period which may be considered the normal condition of the main gating unit, the triode 135 is conducting and the triode 136 is cut off. Upon the application of a negative-going pulse to the triode 135 it is driven to cut-off and the reduced cathode current through the resistor 137 causes the triode 136 to conduct. The plate voltage of the triode 136 drops rapidly to produce a negative-going pulse which is applied by way of capacitor 138 to the input of triode 139 forming part of the monotonic function generator 17.

The monotonic function generator, which forms part of the timing device, is representative of generators for producing a voltage which varies without change in the sign of slope from a predetermined initial value shown as zero in the waveform F (FIG. 2) following an initiating pulse. While a sawtooth generator is preferred it will be understood that the monotonic function may be provided by a train or series of uniformly spaced pulses as disclosed in co-pending application Serial No. 370,376 of Robert A. Broding, John O. Ely and Gerald C. Summers, now U.S. Patent No. 2,949,973. In the latter arrangement the pulses would be generated beginning with the receipt of acoustic energy by receiver R1 and the generation terminated upon receipt of the same acoustic energy by the second receiver R2 whereupon the number of such pulses is proportional to the travel time of the acoustic pulse between the receivers.

The illustrated monotonic function generator is of the type well-known in the art as a bootstrap linear sweep circuit with a compensating network. For a more complete description of the operation of the function generator reference may be had to the aforementioned text, Waveforms, at page 277, fig. 7.23. The voltage between voltage point 140 and the B— ground terminal varies linearly following the application of the gating pulse from the main gating unit or multivibrator 16 to the grid of the triode 139. The application of the gating pulse coincides in time with the onset or first system-responsive pulse of the electrical signal D2 at time to (FIG. 2) produced by the first receiver upon receipt of acoustic energy from the transmitter T. The linearly rising voltage at point 140 is applied to the condenser 14 at time $t_1$, corresponding with the onset or first system-responsive pulse of the electrical signal D3 produced by the second receiver in a manner hereinafter to be described.

The main gating unit, in addition to developing a negative gating pulse for the generator 17, also produces a positive gating pulse, the pulse G, which is effective to operate the downhole switch S, for disconnecting and connecting the receivers R1 and R2 and to open the second receiver gating unit 19.

In operating the downhole switch S the control pulse or positive gating pulse G is applied by way of conductor 142 to the input of a cathode follower 28 (FIG. 3A). The increase of conduction in the cathode follower produces a control pulse across cathode resistor 143 which is transmitted downhole by way of conductor or channel 29 and a phantom circuit including the primary of transformer 22 and the conductors 12. The control pulse G is delayed for a predetermined period by an integrator including capacitor 144 for reasons hereinbefore explained.

In accordance with another aspect of the present invention the capacitor 144 providing the necessary delay is supplied by the capacitance of the cable 11. In commercially available cables there is a capacitive effect which introduces a delay of as much as 35 microseconds per 1,000 feet. Where the cable has insufficient capacitance, supplemental capacitance may be provided by connecting capacitor 145 in parallel with the cable capacitance 144 as by operation of the switch 146.

In the opening of the second receiver gating unit 19 the gating pulse G is applied by way of conductor 147 to the input of an amplifier-inverter 148. Connected in the input of the amplifier is a delay network including integrating network 149. The positive-going pulse applied to the input of the amplifier 148 causes it to increase its conduction resulting in a rapid drop of the plate voltage producing a waveform I of the negative-going character which is applied by way of conductor or channel 31 to open the second receiver gating unit 19. The delay afforded by the integrator 149 may be adjusted to coincide with the delay afforded by the integrator capacitor 144 so that the second receiver can be connected before the opening of the second receiver gating unit 19.

The second receiver gating unit 19 is similar to the first receiver gating unit 18. The normal conduction of the diode-connected triode 150 effectively shorts out potentiometer 151. Upon the application of the negative gating pulse I to the input of triode 152 the triode is driven to cut-off and there results a cut-off of the diode-connected triode 150. Thereafter the rectified signal E3 from the second receiver R2 is provided with an open channel by way of resistor 153 to produce across the potentiometer 151 voltages increasing with the variations in the rectified signal E3. The voltage developed across the potentiometer 151 is applied by way of conductor or channel 38 to the amplifier 35 to initate the sampling and measurement of the instantaneous magnitude of the monotonically varying voltage F as represented by the potential at point 140 of the generator 17.

The amplifier 35 controls the blocking oscillator 36. The anode or plate circuit of the blocking oscillator 36 includes a transformer having a primary winding 154 and three secondary windings 155a, and 155b, and 155c. The first secondary winding 155a forms the feedback loop for control of the blocking oscillator so that its output appears as a single cycle pulse J (FIG. 2). The magnetic coupling indicated by the dotted lines 156a and 156b to windings 155b and 155c momentarily raises the potentials of the control grids of triodes 157 and 158. The triodes are serially connected and together form the switch or keyed rectifier 37. The triodes, normally biased to be non-conductive, are placed in a highly conductive operating condition for an instant coinciding with the generation of the pulse J from the blocking oscillator.

The keyed rectifier 37 is connected in series with condenser 14. Upon closure of the switch or keyed rectifier as produced upon the conduction of the triodes 157 and 158 a charge may flow momentarily into or out of the condenser 14 depending upon whether the voltage already appearing across the condenser is less than or greater than the voltage appearing at the anode of triode 139 as represented by the voltage point 140. The recorder 13 is connected across the capacitor 14 by way of a recorder drive or input circuit of high impedance provided by the triode 159 so that the charge on the condenser 14 is carried significantly only by passage of current through the keyed rectifier 37. By this means, even though there is generation of repeated acoustic pulses from the transmitter T, and the monotonically varying voltage F is repeatedly reproduced, the charge on the capacitor 14 will remain substantially constant so long as the travel time of the acoustic pulse between receivers R1 and R2 is constant. The charge on the capacitor will change only when there is a change in the incremental travel time of acoustic pulses between the receivers. For a more complete description of the measuring circuit, including a suitable saw-tooth generator, the blocking oscillator and the keyed rectifier, reference may be had to my Patent 2,704,364.

Figure 5:
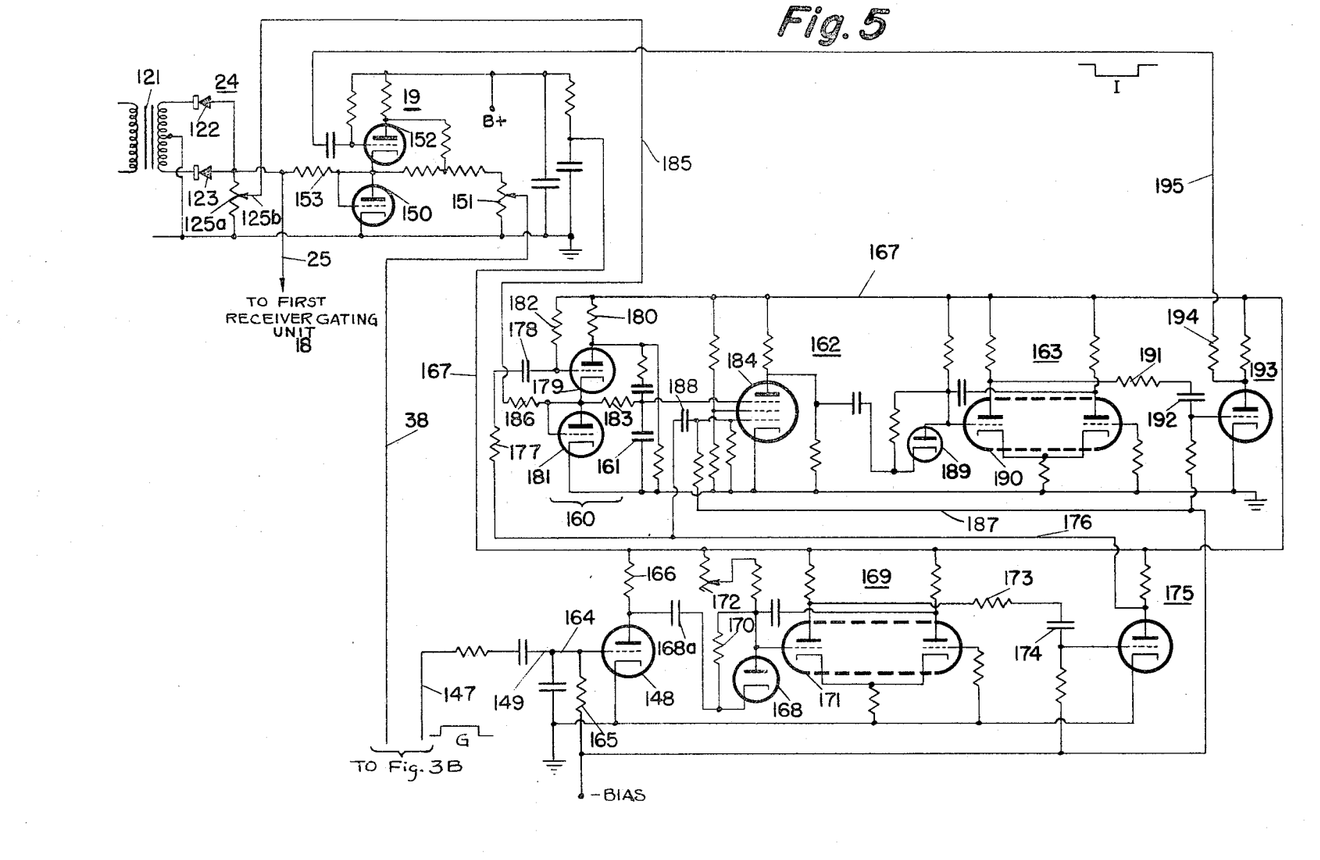
FIG. 5 schematically illustrates a modification of the present invention embodying a noise-sensitive control circuit.

Now that preferred embodiment of the invention has been described, it will be understood that modifications may be made within the spirit and scope thereof. For example, during the course of preparing acoustic logs there may be generated within the borehole noise signals which would obscure and otherwise make ineffective the electrical signals produced by the receivers R1 and R2. Such noise signals are introducible into the system and the measuring equipment can respond thereto to provide ambiguous recordings of the velocity characteristic of earth strata adjacent the borehole. The noise is usually intermittent in character. It may result from any number of causes including banging of the equipment against the walls of the borehole. However, it is desirable to provide in a velocity logging system an arrangement for detecting the presence of noise signals and to render the measuring equipment insensitive to all signals during the period that the noise persists. The system of the present invention is particularly adapted to incorporate the feature of noise detection with but slight changes in the circuits. An arrangement embodying a noise detector is illustrated in the modification of FIG. 5. The noise detector is fully described and claimed in my United States Patent 2,857,011, issued October 21, 1958, and entitled "Noise-Sensitive Control of Acoustic Well Logging Systems."

Briefly, in a short interval following the connection of the second receiver R2 to the uphole equipment and noise energy present downhole will appear in the output from the second receiver. The full-wave rectifier 24 applies all noise information represented by that voltage through a noise gating unit 160 to capacitor 161. The resultant voltage built up on capacitor 161 being negative in polarity with respect to ground biases a coincident circuit 162 to cut-off. This action prevents the control pulse generator by the main gating unit in response to the signal from the first receiver from actuating a multivibrator 163 which, in the absence of noise, is responsive to produce a gating pulse for opening the second receiver gating unit 19. Thus, if noise is present the second receiver gating unit will not be opened.

Now that the general principles of operation of the noise detector have been set forth, there will be undertaken a specific description of the noise control circuits.

It will be recalled that main gating unit 16 (FIG. 3B) is actuated by the signal E2 (FIG. 2) representative of the output of the first receiver R1. The output from the first tube 135 of the main gating unit 16 is applied by way of conductor 147 to the integrating circuit 149. The output of integrating circuit is applied by way of conductor 154 to the control grid of the triode 148. The cathode of triode 148 is connected directly to ground.

The grid of triode 148 is connected by way of resistor 165 to a source of negative bias which maintains tube 148 normally cut off. The anode of tube 148 is connected by way of load resistor 166 to a bus 167 which is connected to a source B+. A voltage of waveform G (FIG. 2) is applied to the grid of tube 148 rendering it conductive a time interval as determined by the integrating network 149 after the abrupt voltage rise thereof.

The anode of tube 148 is connected by way of condenser 168a through diode 168 to the control grid of the first stage of a multivibrator 169. The diode 168 is connected to condenser 168a at its cathode and to the input of multivibrator 169 at its anode. A resistor 170 is connected across the diode 168. The grid of tube 171 and the anode of diode 168 are connected by way of variable resistor 172 to bus 167. The negative pulse at the anode of tube 148 coupled through diode 168 actuates the multivibrator 169 to generate a rectangular voltage at the anode of the input stage of tube 171. This voltage, positive in sign and rectangular in form, is transmitted by way of resistor 173 and capacitor 174 to the grid of a shaper stage 175. The voltage is controllable by resistor 172 to adjust the length of the pulse. An operator may by this means select the length of the period in which for control purposes the system will be sensitive to noise.

The output of shaper stage 175 is a negative rectangular pulse. The latter pulse is transmitted from the anode of shaper 175 by way of conductor 176, resistor 177 and condenser 178 to the control terminal of noise gate circuit 160. More particularly, one terminal of condenser 178 is connected to the control grid of a triode 179 whose anode is connected by way of resistor 180 to the bus 167 and whose cathode is connected to the anode of a second triode 181 whose cathode, in turn, is connected to ground.

The control grid of tube 181 is connected directly to the anode thereof so that it operates as a diode. The B+ bus 167 is connected by way of resistor 182 to the control grid of tube 179. The juncture between tubes 179 and 181 is connected by way of resistor 183 to the suppressor grid of a pentode 184 in the coincidence circuit 162. The condenser 161 is connected between the suppressor grid of pentode 184 and ground.

In operation triode 179 normally is highly conductive so that the tube 181 offers little, if any, impedance thus shunting the control signal path. The control signal path may be traced through transformer 121 connected at the center tap of its secondary winding to ground. Two diodes 122 and 123 are connected in series opposition with the extremities of the secondary winding of transformer 121. The common juncture between diodes 122 and 123 is connected to ground through resistor 125a. An adjustable tap 125b on resistor 125a forming a part of the control signal path is connected by way of conductor 185 and resistor 186 to the common terminal between tubes 179 and 181. When tube 179 is conducting, the suppressor grid of tube 184 is maintained at ground potential by tube 181. However, when the signal from the shaper circuit 175 is applied to the grid of tube 179, conduction therethrough is terminated and tube 181 becomes a high impedance, thereby permitting transmission of signals from the tap 125b to the suppressor grid of tube 184. This signal, rectified and negative in sense with respect to ground, charges condenser 161 negative.

It is to be noted that the control grid of pentode 184 is connected by way of conductor 187 to the source of negative bias to cut-off. In the event of absence of noise signals in a selected time interval the suppressor grid of tube 184 is without bias so that the coincidence circuit 162 will conduct upon application of a positive pulse transmitted to the control grid of tube 184 by way of condenser 188. The resultant negative pulse appearing in the anode circuit of tube 184 is transmitted by way of a diode 189 to the multivibrator 163. The circuit of diode 189 is similar in its operation to that above described in connection with tube 168.

Multivibrator 163 then produces at the anode of the tube 190 a positive rectangular pulse of duration equal that of the pulse from the shaper 175. The signal from tube 190 is applied by way of resistor 191 and condenser 192 to the grid of a shaper and inverter stage 193. The voltage of form I (FIG. 2) is then applied by way of resistor 194 and conductor 195 to the control grid of the receiver gating unit 19 which includes triode 152 and which operates to open the signal channel for transmission of signals from the second receiver R2 produced upon arrival of an acoustic pulse from the transmitter.

It can be seen from the above description of the operation of the noise detector that the features of the present invention will cooperate with the noise detector to enhance its effectiveness in detecting only the noise generated downhole in the vicinity of the second receiver. In the absence of the system embodying the present invention noise signals detected by the first receiver after the arrival of the acoustic pulse at the first receiver and before arrival of the acoustic pulse at the second receiver could be cross-fed to circuits associated with the second receiver. Such noise signals could be effective to cause the operation of the noise detector to maintain the second receiver gating unit in a closed condition. Hence, the second receiver gating unit would be maintained closed even though in fact there was no noise in the vicinity of the second receiver. By alternately connecting and disconnecting the first and second receivers and by providing a single transmission line for both receivers, all in accordance with one of the aspects of the present invention, it is assured that the noise detector will respond only to noise in the vicinity of the second receiver.

What is claimed is:

1. In a borehole exploring system, the combination of a transmitter, a first receiver and a second receiver spaced one from the other along the length of the borehole and in spaced relation with said transmitter, circuit-changing means operatively associated with said receivers normally for connecting said first receiver to a transmission line extending uphole and for disconnecting said second receiver from the transmission line, means for energizing said transmitter to produce an acoustic pulse, means located at the earth's surface and responsive to the arrival of said pulse at said first receiver for energizing a timing device and for operating said circuit-changing means to disconnect said first receiver from and to connect said second receiver to the transmission line extending uphole, said timing device being responsive to the arrival of said acoustic pulse at said second receiver for measuring the time of travel of said acoustic pulse along a path whose length through the strata adjacent said borehole corresponds with the spacing between said receivers.

2. In an acoustic well logging system of the type including a time interval measuring means, the combination which comprises means for generating an acoustic pulse, a first receiver separated from said generating means for producing a first elecrical signal in response to said acoustic pulse, a second receiver spaced from said generating means a greater distance therefrom than said first receiver for generating a second electrical signal in response to said acoustic pulse, means operatively associated with said receivers for alternatively connecting either said first receiver or said second receiver to said time interval measuring means, means responsive to said first electrical signal for initiating the operation of said time interval measuring means, and means responsive to said first-signal response means for initiating operation of said connecting means to disconnect said first receiver and said time interval measuring means and to connect said second receiver and said time interval measuring means for application of said said second electrical signal to said measuring means for measurement of an elapsed time representative of the velocity of the acoustic wave through earth strata adjacent said first and second receivers.

3. In a well logging system of the acoustic type in which a monotonic signal generating means is provided for generating a monotonically varying signal upon the occurrence of a signal generated at a first receiver and in which the instantaneous value of the monotonically varying signal is measured by a magnitude measuring means upon generation of a second signal from a second receiver, the improvement which comprises switch means in circuit with said receivers, said generating means and said measuring means for alternately blocking the first receiver signal and the second receiver signal, means in circuit between said first receiver and said generating means and responsive to a signal from the first receiver for producing a control signal and for initiating the generation of the monotonically varying signal, and circuit means in circuit between said control signal generating means and said switch means and responsive to said control signal for operating said switch means for disconnecting the first receiver from the monotonic signal generating means and for connecting the second receiver to the magnitude measuring means for applying the second receiver signal to the magnitude measuring means for measurement of the instantaneous value of the monotonically varying signal.

4. In a borehole exploring system, the combination of a transmitter for generating an acoustic pulse, a first receiver and a second receiver spaced one from the other along the length of the borehole and in spaced relation with said transmitter, a transmission line extending uphole from the vicinity of said receivers, circuit-controlling means in circuit between said transmission line and said receivers normally for connecting said first receiver to said transmission line and for disconnecting said second receiver from said transmission line, a time interval measuring means located at the earth's surface, means in circuit between said first receiver and said measuring means and responsive to the arrival of said pulse at said first receiver for initiating the operation of said time interval measuring means and for operating said circuit controlling means to disconnect said first receiver from and to connect said second receiver to said transmission line, and circuit means at the earth's surface electrically connected between said second receiver and said measuring means and responsive to the arrival of said pulse at said first receiver for providing an electrical path for an electrical signal from said second receiver to said time interval measuring means, said time interval measuring means being responsive to said electrical signal corresponding with the arrival of said acoustic pulse at said second receiver for measuring the time interval for travel of said acoustic pulse along a path through the strata adjacent said borehole of length corresponding to the spacing between said receivers.

5. In a borehole exploring system, the combination of a transmitter for generating an acoustic pulse, a first receiver and a second receiver spaced one from the other along the length of the borehole and in spaced relation with said transmitter, a transmission line extending uphole from the vicinity of said receivers, electronic switching means normally for connecting said first receiver to said transmission line, a multivibrator located at the earth's surface and responsive to the arrival of said pulse at said first receiver for producing control pulses, a monotonic function generating means responsive to a first of said control pulses for initiating the generation of a monotonically varying function, said electronic switching means being responsive to a second of said control pulses to disconnect said first receiver from said transmission line, means coupled to said monotonic function generating means for measuring the instantaneous value of said monotonically varying function at a time corresponding with the arrival of said acoustic pulse at said second receiver, and circuit means at the earth's surface electrically connected between said second receiver and said measuring means and responsive to said second of said control pulses for applying to said measuring means an electrical signal from said second receiver corresponding with the arrival of said acoustic pulse at said second receiver.

6. In a borehole exploring system, the combination of a transmitter for generating an acoustic pulse, a first receiver and a second receiver spaced one from the other along the length of the borehole and in spaced relation with said transmitter, a transmission line extending uphole from the vicinity of said receivers, circuit-changing means electrically connected between said receivers and said transmission line and normally for connecting said first receiver to said transmission line and for disconnecting said second receiver from said transmission line, control pulse producing means located at the earth's surface and responsive to the arrival of said acoustic pulse at said first receiver for generating control pulses, a time interval measuring means operatively associated with said pulse producing means and responsive to a first of said control pulses to initiate operation of said measuring means, said circuit-changing means being responsive to a second of said control pulses to disconnect said first receiver from and to connect said second receiver to said transmission line, means in circuit between said pulse producing means and said circuit-changing means for effectively delaying the application of said second pulse to said circuit-changing means, first circuit means at the earth's surface electrically connected between said second receiver and said measuring means and responsive to said second of said control pulses for applying an electrical signal from said second receiver to said time interval measuring means, means in circuit between said pulse generating means and said first circuit means for delaying the response of said first circuit means at least until said circuit-changing means has responded to connect said second receiver, said time interval measuring means being responsive to said electrical signal corresponding with the arrival of said acoustic pulse at said second receiver for measuring the time interval of travel of said acoustic pulse along a path through the strata adjacent said borehole of length corresponding to the spacing between said receivers.

7. In an acoustic well logging system of the type including a time interval measuring means, the combination which comprises means for generating an acoustic pulse, a first receiver spaced from said generating means for producing a first electrical signal in response to said acoustic pulse, circuit means for connecting said first receiver to the time interval measuring means, the time interval measuring means being responsive to the arrival at said first receiver of said acoustic pulse as represented by the onset of said first electrical signal to initiate the production of a monotonic function, a second receiver spaced from said generating means and more remote therefrom than said first receiver for generating a second electrical signal in response to said acoustic pulse, said circuit means being responsive to the onset of said first electrical signal for disconnecting said first receiver and for connecting said second receiver for application of said second electrical signal to said measuring means, and means in circuit with said second receiver and responsive to spurious noise generated in the vicinity of said second receiver in the interval of time between the disconnection of said first receiver and the generation of said second electrical signal for blocking said second electrical signal, said measuring means being responsive in the absence of noise to said second electrical signal for determining the elapsed time between generation of said first and said second electrical signals.

8. A well logging system for determining the velocity characteristic of earth strata adjacent a borehole comprising a transmitter for producing a pulse of acoustic energy, a first receiver and a second receiver spaced from each other and from said transmitter for producing electrical signals upon arrival of acoustic energy from said transmitter, a time interval measuring means at the earth's surface for measuring the elapsed time for an acoustic pulse to travel from a point adjacent said first receiver to a point adjacent said second receiver by way of earth strata adjacent the borehole, a transmission line interconnecting said receivers and said measuring means, means for connecting said first receiver to one end of said transmission line for transmission of a first electrical signal therefrom to the earth's surface, a first circuit means in circuit with said transmitter and said measuring means and responsive to the initiation of said acoustic energy by said transmitter for connecting a first input of said time interval measuring means to an opposite end of said transmission line for energization of said measuring means in response to the production of said first electrical signal, means within the borehole operatively associated with said receivers and responsive to the production of said first electrical signal for disconnecting said first receiver from said transmission line and for connecting said second receiver to said transmission line, and a second circuit means in circuit with said first receiver and said measuring means and responsive to said first electrical signal to connect a second input of said time interval measuring means to said transmission line for response to the production of a second electrical signal produced by said second receiver upon arrival of said acoustic pulse to effect a measurement of the elapsed time interval between the production of said first and said second electrical signals.

9. A well logging system for determining the velocity characteristic of earth strata adjacent a borehole comprising a transmitter for producing a pulse of acoustic energy, a first receiver and a second receiver spaced from each other and from said transmitter for producing electrical signals in response to arrival of acoustic energy from said transmitter, a time interval measuring means for measuring the elapsed time for an acoustic pulse to travel from a point adjacent said first receiver to said second receiver by way of earth strata adjacent the borehole, a transmission line interconnecting said receivers and said measuring means, circuit-changing means for connecting said first receiver to one end of said transmission line for transmission of a first electrical signal therefrom to the earth's surface, a first electronic gating unit responsive to the initiation of said acoustic energy by said transmitter for connecting a first input of said time interval measuring means to an opposite end of said transmission line for energization of said measuring means in response to the production of said first electrical signal, means within the borehole operatively associated with said receivers and responsive to the production of said first electrical signal for disconnecting said first receiver from said transmission line and for connecting said second receiver to said one end of said transmission line, a second electronic gating unit responsive to the production of said first electrical signal to connect a second input of said time interval measuring means to said opposite end of said transmission line for response to the production of a second electrical signal produced by said second receiver upon arrival of said acoustic pulse to effect a measurement of the elapsed time interval between the production of said first and said second electrical signals.

10. A well logging system for determining the velocity characteristic of earth strata adjacent a borehole comprising a transmitter for producing a pulse of acoustic energy, a first receiver and a second receiver spaced from each other and from said transmitter, a time interval measuring means including a monotonic function generator and means for measuring the instantaneous magnitude of a monotonic function produced by said generator for determining the elapsed time for an acoustic pulse to travel from a point adjacent said first receiver to a point adjacent said second receiver by way of earth strata adjacent the borehole, a transmission line between said receivers and said time interval measuring means, switching means for connecting said first receiver to one end of said transmission line for transmission of a first electrical signal therefrom to said time interval measuring means, said first electrical signal being representative of the arrival of said acoustic pulse at said first receiver, a first circuit means in circuit with said transmitter and said function generator and responsive to the initiation of said acoustic energy by said transmitter for connecting said monotonic function generator to an opposite end of said transmission line for production of said monotonic function in response to the generation of said first electrical signal, said switching means being responsive to the production of said first electrical signal for disconnecting said first receiver from said one end of said transmission line and for connecting said second receiver to said one end of said transmission line, means for delaying the response of said switching means, a second circuit means electrically connected between said first receiver and said measuring means and responsive to the production of said first electrical signal for connecting said instantaneous magnitude measuring means to said opposite end of said transmission line for response to the production of a second electrical signal produced by said second receiver upon arrival of said acoustic pulse at said second receiver, and means in circuit between said first receiver and said second circuit means for delaying the operation of said second circuit means at least until said second receiver has been connected, said measuring means being responsive to the production of said second electrical signal to effect a measurement of the instantaneous magnitude of said monotonic function.

11. The well logging system of claim 10 in which said first-mentioned delay is provided by an integrator including capacitance provided by said transmission line between said receivers and said time interval measuring means.

12. In a well logging system of the type in which signals produced by spaced receivers in response to the arrival of an acoustic pulse are applied by way of a transmission line to a time interval measuring means, the improvement which comprises a switching arrangement operatively associated with said receivers and said transmission line for alternately connecting the two receivers to the transmission line extending to the earth's surface and to the time interval measuring means, said switching arrangement including an electronic switching device, and means in circuit with said switching device and responsive to the production of an electrical signal by a first of the receivers for controlling the switching device to disconnect the first receiver from the transmission line and to connect the second receiver to the transmission line.

13. The system of claim 12 in which said controlling means comprises a pulse generator responsive to the arrival of the acoustic pulse at the first receiver for generating a control pulse, and means responsive to said control pulse for actuating said electronic switching device.

14. The system of claim 12 in which said electronic switching device is comprised of a pair of electronic tubes whose inputs are respectively electrically connected to the first receiver and to the second receiver, means for rendering one of said tubes conductive, and means for rendering the other of said tubes at cut-off to effectively disconnect its associated receiver, said control means being responsive upon the arrival of an acoustic pulse at the first receiver to produce control pulses to drive said conducting tube to cut-off and to render said cut-off tube conductive so as effectively to disconnect the first receiver from the transmission line and to connect the second receiver to the transmission line.

15. In a borehole exploring system, the combination of a transmitter for generating an acoustic pulse, a first receiver and a second receiver spaced one from the other along the length of the borehole, and in spaced relation with said transmitter, a transmission line extending up-hole from the vicinity of said receivers, circuit-changing means connected between said receivers and said transmission line normally for connecting said first receiver to said transmission line and for disconnecting a second receiver from said transmission line, control pulse generating means located at the earth's surface, a first circuit means responsive to the initiation of said acoustic energy by said transmitter for connecting said control pulse generating means to said transmission line for response to a first electrical signal generated by said first receiver, said control pulse generating means being responsive upon the arrival of said acoustic pulse at said first receiver for generating control pulses, a monotonic function generating means responsive to a first of said control pulses to initiate the production of a monotonic function, said circuit-changing means being responsive to a second of said control pulses to disconnect said first receiver from and to connect said second receiver to said transmission line, means for effectively delaying the application of said second control pulse to said circuit-changing means, magnitude measuring means responsive to the production of a second electrical signal from said second receiver for measuring the instantaneous magnitude of said monotonic function, a second circuit means at the earth's surface electrically connected between said second receiver and said measuring means and responsive to said second of said control pulses for completing an electrical path between said magnitude measuring means and said second receiver by way of said transmission line, and means connected between said second circuit means and said control pulse generating means for delaying the application to said second circuit means of one of said control pulses at least until said second receiver is connected.

16. In a borehole exploring system, the combination of a transmitter for generating an acoustic pulse, a first receiver and a second receiver spaced one from the other along the length of the borehole and in spaced relation with said transmitter, a transmission line extending up-hole from the vicinity of said receivers, circuit-changing means connected between said receivers and said transmission line normally for connecting said first receiver to said transmission line for disconnecting said second receiver from said transmission line, control pulse generating means located at the earth's surface, a first circuit means responsive to the initiation of said acoustic energy by said transmitter for connecting said control pulse generating means to said transmission line for response to the arrival of said acoustic pulse at said first receiver for generating control pulses, a time interval measuring means responsive to a first of said control pulses to initiate a timing operation, said circuit-changing means being responsive to a second of said control pulses to disconnect said first receiver from and to connect said second receiver to said transmission line, a second circuit means at the earth's surface electrically connected between said second receiver and said measuring means and responsive to said second of said control pulses for completing an electrical path between said time interval measuring means and said second receiver by way of said transmission line, and noise-sensitive means responsive to the presence of noise in the vicinity of said second receiver for preventing the operation of said second circuit means during the production of noise to avoid false measurement by said time interval measuring means, said time interval measuring means being responsive in the absence of said noise to the arrival of said acoustic pulse at said second receiver for measuring the time elapsed since the arrival of said acoustic pulse at said first receiver.

17. In a borehole exploring system, the combination of a transmitter for generating an acoustic pulse, a first receiver and a second receiver spaced one from the other along the length of the borehole and in spaced relation with said transmitter, a transmission line extending up-hole from the vicinity of said receivers, circuit-changing means connected between said receivers and said transmission line normally for connecting said first receiver to said transmission line and for disconnecting said second receiver from said transmission line, control pulse generating means located at the earth's surface, a first circuit means responsive to the initiation of said acoustic energy by said transmitter for connecting said control pulse generating means to said transmission line for response to the arrival of said acoustic pulse at said first receiver for generating control pulses, a monotonic function generating means responsive to a first of said control pulses to initiate the production of a monotonic function, said circuit-changing means being responsive to a second of said control pulses to disconnect said first receiver from and to connect said second receiver to said transmission line, means for effectively delaying the application of said second control pulse to said circuit-changing means, means responsive to the production of an electrical signal generated by said second receiver for measuring the instantaneous magnitude of said monotonic function, a second circuit means at the earth's surface electrically connected between said second receiver and said measuring means and responsive to said second of said control pulses for completing an electrical path between said means for measuring the instantaneous magnitude of said monotonic function and said second receiver by way of said transmission line, and noise-sensitive means responsive to the generation of spurious noise in the vicinity of said second receiver for preventing the operation of said second circuit means during the production of noise to avoid false measurement of said monotonic function.

18. A borehole exploring system comprising circuitry including a transmitter, a first receiver and a second receiver spaced one from the other along the length of the borehole and in fixed spaced relation with each other, each of said receivers being responsive to the receipt thereat of an acoustic pulse from said transmitter for the production of a wavetrain signal comprised of a series of pulses, timing means electrically connected to said circuitry for measuring the difference between total travel time of an acoustic pulse from said transmitter to said first receiver through an adjacent earth formation and the total travel time of said pulse from said transmitter to said second receiver through an adjacent earth formation, and a circuit connected between said circuitry and said timing means for rejecting the first pulse of each of said series of pulses from and for passing other pulses including a second pulse of said series of pulses to said timing means, said timing means being responsive to a selected one of said passed pulses including said second pulse from said first receiver to initiate the measurement of said difference in total travel time and responsive to a corresponding pulse of like character from said second receiver for measuring said difference in total travel time.

19. An exploring system for measurement of a velocity function of a predetermined length of earth formation penetrated by a borehole, comprising a transmitter, a first receiver and a second receiver spaced in fixed relation one from the other and movable as a unit along the borehole, timing means for measuring the difference between the total travel time of an acoustic pulse from said transmitter to said first receiverd through the earth formation adjacent the borehole and opposite said receivers and the total travel time of said pulse from said transmitter to said second receiver through the earth formation adjacent the borehole between said transmitted and said second receiver, circuit means operatively associated with said receivers and operatively associated with said timing means for application to said timing means of a signal from said first receiver representative of the arrival at said first receiver of said acoustic pulse to initiate the measurement of said difference in total travel time and for application to said timing means of a signal from said second receiver representative of the arrival at said second receiver of said acoustic pulse for the measurement of said difference in total travel time, switching means electrically connected between said receivers and said circuit means for disconnecting said first receiver from said circuit means and for connecting said second receiver to said circuit means after detection of said acoustic pulse by said first receiver and prior to the arrival of said acoustic pulse at said second receiver, and means responsive to the presence of noise in said circuit means for preventing the application of said signal from said second receiver to said timing means for measurement of said difference in total travel time, said switching means being operative for disconnecting said second receiver from said circuit means and for reconnecting said first receiver to said circuit means to prepare for a subsequent time measuring operation to be completed in the absence of noise in said circuit means when said second receiver is again connected to said circuit means.

20. In a well logging system of the type in which spaced receivers are connected by an electric circuit to a time interval measuring means and in which electric signals produced by the spaced receivers in response to the arrival of an acoustic pulse from a transmitter spaced from the receivers are applied to the time interval measuring means the improvement which comprises a circuit means operatively associated with said electric circuit and responsive to the production of one of the electric signals by a first of the receivers closest the transmitter for attenuating that portion of the electric signal from that receiver following response by said circuit means.

21. A system for determining interval velocity functions of earth formations penetrated by a borehole, comprising means for generating an acoustic pulse, first means responsive to the arrival of the acoustic pulse at a first point in the borehole spaced from said generating means for generating a first electrical signal, a time function generating means, means operatively associated with said function generating means and said first responsive means and responsive to the generation of a first portion of said first electrical signal for initiating the generation of a time function by said time function generating means, means operatively associated with said first responsive means and responsive to the generation of said first portion of said first electrical signal for attenuating at a location in the vicinity of said first electrical signal generating means the remaining portion of said first electrical signal prior to the arrival of said acoustic pulse at a second point in said borehole, second means located at a second point in said borehole spaced from said first point and from said acoustic-pulse generating means and responsive to the arrival of said acoustic pulse thereat for generating a second electrical signal, and means operatively associated with said second means and said function generating means and responsive to the generation of said second electrical signal for recording the magnitude of said time function.

22. In a well logging system of the type in which receivers are spaced along the length of a borehole and are connected by an electric circuit to a time interval measuring means and in which electric signals produced by the spaced receivers in response to the arrival of acoustic pulses from a transmitter spaced from and to one side of both receivers are applied to the time interval measuring means, the improvement which comprises a control circuit means operatively associated with said electric circuit and responsive to the production of one of the electric signals by one of the receivers for attenuating that portion of the electric signal from the receiver closest the transmitter following response by said control circuit means.

23. In an acoustic well logging system of the type including a time interval measuring means, the combination which comprises a transmitter for generating acoustic pulses, a first receiver spaced from said transmitter for producing a first electrical signal in response to one of said acoustic pulses, a second receiver spaced from said transmitter and more remote from said transmitter than said first receiver for generating a second electrical signal in response to said one of said acoustic pulses, first circuit means operatively associated with said receivers for connecting and disconnecting said first receiver and said second receiver to and from said time interval measuring means, and second circuit means operatively associated with said first receiver and said first circuit means and responsive to generation of said first electrical signal for energizing said first circuit means for disconnecting said first receiver from and for connecting said second receiver to said measuring means for application thereto of said second electrical signal.

24. In a well logging system of the type in which spaced first and second receivers are connected by an electric circuit to a time interval measuring means and in which electric signals produced by the spaced receivers in response to the arrival of an acoustic pulse from a transmitter spaced from the receivers are applied to the time interval measuring means, the improvement which comprises a switching means operatively associated with said electric circuit and responsive to the production of one of said electric signals by said first of the receivers closest the transmitter for connecting the second of the receivers to the electric circuit.

25. A seismic well logging instrument comprising:
 means for transmitting seismic impulses;
 at least two spaced receivers for receiving said impulses and producing a transient voltage pulse;
 a first normally conducting amplifier means, one of said receivers being coupled to said first amplifier means;
 a trigger circuit, said trigger circuit being coupled to said first amplifier means to return said first amplifier means to a non-conducting condition after said first amplifier means has reproduced at least a half cycle of said first receiver voltage pulse;
 a second amplifier, the other of said receivers being coupled to said second amplifier;
 an indicating means, said first and second amplifier means being coupled to said indicating means.

26. A circuit for amplifying the pulses received at two receivers spaced unequal distances from a seismic pulse transmitter comprising:
 a first normally conducting amplifier means, said first amplifier being coupled to the receiver that first receives the seismic pulse;
 a second normally conducting amplifier means and a trigger circuit, said first amplifier being coupled to said second amplifier means, said second amplifier being coupled to said trigger circuit, said trigger circuit returning said second amplifier means to a non-conduction condition after the second amplifier means has produced at least a half cycle of the pulse from said above mentioned receiver;
 a third amplifier means, the other receiver being coupled to said third amplifier means;
 an indicating means, said second and third amplifier means being coupled to said indicating means.

27. An acoustical well-logging system comprising:
 a transmitter for producing acoustical impulses;
 at least two spaced receivers, each of said receivers being capable of receiving said acoustical impulses and converting them to fluctuating electrical signals;
 a first and second amplifier means, said two receivers being coupled to said first and second amplifier means respectively;
 a circuit means, said first and second amplifiers being coupled to said circuit means to transmit the amplified fluctuating signals to use location;
 a trigger circuit, the output of at least one of said amplifier means being coupled to said trigger circuit and said trigger circuit being coupled to the amplifying means coupled to one of said receivers to effectively silence said one receiver after the production of the initial one half cycle of said fluctuating signal.

28. A trigger circuit for effectively silencing a normally conducting amplifier of the receiver used in an acoustical well logging system comprising:
 an electronic trigger circuit, the output of said trigger circuit being coupled to the output of said normally conducting amplifier and the output of said trigger circuit being coupled to the normally conducting amplifier to bias the amplifier beyond its cut-off point;
 said trigger circuit in addition being disposed to be actuated by a pulse of predetermined polarity and magnitude resulting from an acoustical signal received by the receiver, the predetermined polarity and magnitude of said pulse being chosen to permit the amplifier to reproduce the first half cycle of the receiver signal.

29. A downhole instrument for acoustical well logging comprising:
 a receiver capable of receiving and converting an acoustical impulse into an alternating electrical signal;
 a normally conducting amplifying circuit, said receiver being coupled to said amplifying circuit;
 a trigger circuit, said trigger circuit being coupled to said amplifying circuit to effectively silence said amplifying circuit, said trigger circuit being actuated by a signal of predetermined polarity and magnitude, the polarity of said signal being chosen to actuate said trigger circuit after the amplifying circuit has reproduced at least a half cycle of the electrical signal from the receiver and the magnitude being set slightly above the noise level of the downhole instrument.

30. A downhole instrument for acoustical well logging comprising:
 a receiver capable of receiving and converting an acoustical impulse into an alternating electrical signal;
 a normally conducting amplifying circuit, said receiver being coupled to said amplifying circuit;
 a trigger circuit, the output of said amplifying circuit being coupled to the output of said trigger circuit, the output of said trigger circuit being coupled to said amplifying circuit to effectively bias said amplifying circuit beyond its cut-off level, and said trigger circuit being actuated by a signal of predetermined polarity and magnitude, the polarity of said signal being chosen to permit the amplifying circuit to reproduce at least a half cycle of the electrical signal from the receiver and the magnitude being set slightly above the noise level of the downhole instrument.

31. The method of determining a characteristic of earth formations disposed adjacent a borehole comprising:
 generating repetitive acoustic pulses at a transmitting station of a downhole instrument,
 detecting the arrival of said acoustic pulses at first and second receiving stations spaced from said transmitting station,
 connecting only one of said receiving stations to a circuit coupled to an uphole location, and
 disconnecting said one receiving station from said circuit and simultaneously connecting the other of said receiving stations to said circuit in response to the appearance of acoustic energy at one of said receiving stations to prevent intermingling of the electric signals from said receiving stations.

32. In an acoustic well logging system of the type including a plurality of transducers comprising:
 at least one transmitter for producing time spaced pulses of acoustic energy and
 at least two receivers for producing electric signals upon appearance of acoustic energy thereat, and downhole means for connecting and disconnecting said receivers to and from a single electric circuit coupled to an uphole utilization device in order to avoid intermingling of the electric signals from said receivers, the improvement comprising:

circuit means responsive to the appearance of acoustic energy at one of said receivers for controlling the connection of one of said receivers to said electric circuit and the disconnection of the other said receivers from said electric circuit.

33. A borehole exploring system comprising:

a transmitter, a first receiver and a second receiver spaced one from the other along the length of the borehole and in fixed spaced relation which each other, each of said receivers being responsive to the receipt thereat of acoustic pulses from said transmitter for the production of wave-train signals comprised of a series of pulses.

timing means electrically connected to said receivers for producing a signal representative of the travel time of acoustic pulses between said receivers by way of adjacent earth formations, and a circuit connected between said receivers and said timing means for rejecting the first pulse of each of said series of pulses from and for passing other pulses including a second pulse of said series of pulses to said timing means and for rejecting odd-number pulses from said receivers.

34. A borehole exploring system comprising:

a transmitter for producing acoustic impulses, a first receiver and a second receiver spaced one from the other along the length of the borehole and in fixed spaced relation with each other, each of said receivers being responsive to the receipt thereat of acoustic pulses from said transmitter for producing therefrom a wave-train of signals, timing means electrically connected to said receivers for producing a signal representative of the travel time of acoustic pulses between said receivers by way of adjacent earth formations, and a circuit connected between said receivers and said timing means for rejecting a first portion of said wave-train and for passing at least a part of the remaining portion of said wave-train to said timing means.

References Cited by the Examiner

UNITED STATES PATENTS

| | | | |
|---|---|---|---|
| 2,088,588 | 8/1937 | Dudley | 181—.5 |
| 2,691,422 | 10/1954 | Summers et al. | 181—.5 |
| 2,704,364 | 3/1955 | Summers | 181—.5 |
| 2,708,485 | 5/1955 | Vogel | 181—.5 |
| 2,728,047 | 12/1955 | Doll | 181—.5 |
| 2,743,785 | 5/1946 | Lee | 181—.5 |
| 2,931,455 | 4/1960 | Loofbourrow | 181—0.5 |
| 2,938,592 | 5/1960 | Charske et al. | 181—0.5 |

BENJAMIN A. BORCHELT, *Primary Examiner.*

CHARLES W. ROBINSON, LAWRENCE V. EFNER, CHESTER L. JUSTUS, *Examiners.*

M. J. MARNCOCK, A. E. HALL, S. J. TOMSKY, R. M. SKOLNIK, *Assistant Examiners.*

UNITED STATES PATENT OFFICE
CERTIFICATE OF CORRECTION

Patent No. 3,297,983

January 10, 1967

Gerald C. Summers

It is hereby certified that error appears in the above numbered patent requiring correction and that the said Letters Patent should read as corrected below.

Column 1, line 24, strike out "the", second occurrence; column 7, line 22, for "generatl" read -- general --; column 13, line 73, for "to" read -- $t_o$ --; column 14, line 58, for "initate" read -- initiate --; line 65, strike out "and", first occurrence; column 15, line 14, for "carried" read -- varied --; line 54, for "and" read -- any --; line 62, for "generator" read -- generated --; column 17, line 70, for "response" read -- responsive --; line 74, strike out "said", second occurrence; column 22, line 42, after "line" insert -- and --; column 23, line 62, for "receiverd" read -- receiver --; line 66, for "transmitted" read -- transmitter --; column 24, line 23, after "means", first occurrence, insert a comma; column 25, line 70, before "use" insert -- a --; column 27, line 20, for "pulse." read -- pulse, --; column 28, line 23, for "5/1946" read -- 5/1956 --.

Signed and sealed this 19th day of September 1967.

(SEAL)
Attest:

ERNEST W. SWIDER
Attesting Officer

EDWARD J. BRENNER
Commissioner of Patents